W. S. PIERCE.
PIPE COUPLING.
APPLICATION FILED FEB. 20, 1915.
1,153,824.
Patented Sept. 14, 1915.
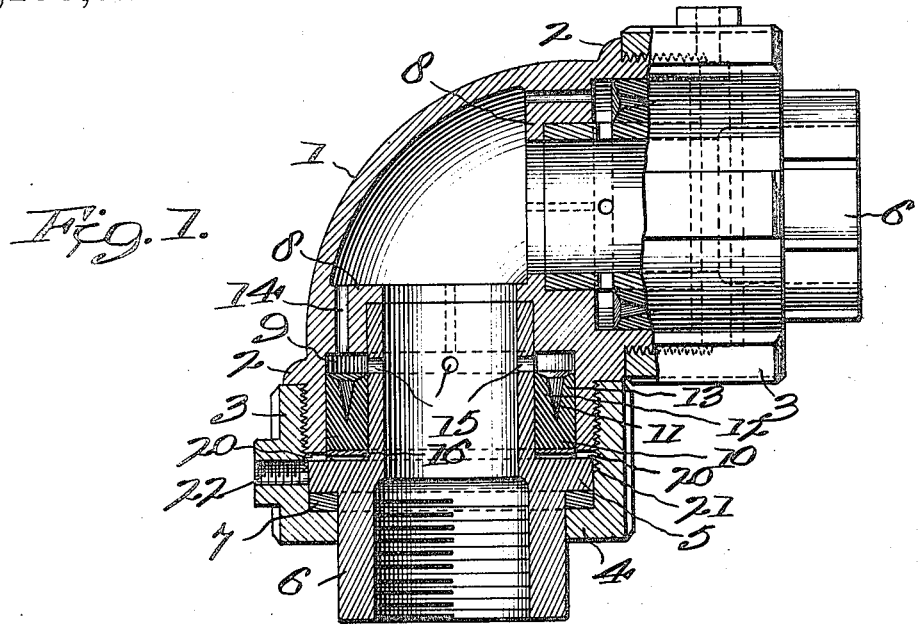
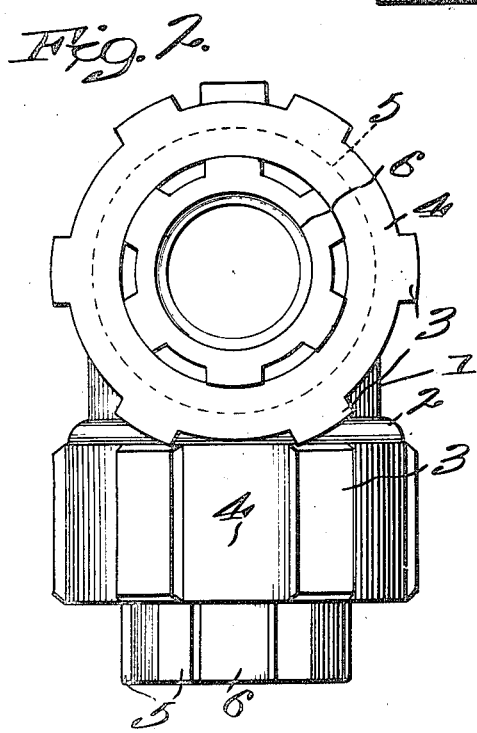
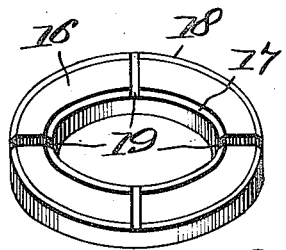
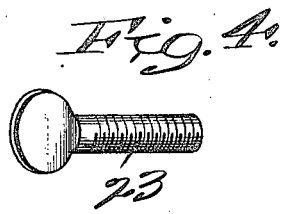
Witnesses
Edwin J. Beller.
R. J. Mawhinney,
Inventor
William S. Pierce,
By Wilkinson, Ginola & MacKay
Attorneys

UNITED STATES PATENT OFFICE.

WILLIAM S. PIERCE, OF FRANKLIN, PENNSYLVANIA.

PIPE-COUPLING.

1,153,824.    Specification of Letters Patent.    Patented Sept. 14, 1915.

Application filed February 20, 1915. Serial No. 9,741.

*To all whom it may concern:*

Be it known that I, WILLIAM S. PIERCE, a citizen of the United States, residing at Franklin, in the county of Venango and State of Pennsylvania, have invented certain new and useful Improvements in Pipe-Couplings; and I do hereby declare the following to be a full, clear, and exact description of the invention, such as will enable others skilled in the art to which it appertains to make and use the same.

The present invention relates to pipe couplings, and consists more particularly in an improved pipe coupling especially designed for connecting the flexible metallic conduits between the locomotive and tender and between railway cars for conveying air, steam, water, or other fluid, although I do not wish to be understood as restricting the invention to this application alone.

It is an object of the present invention to produce a pipe coupling of this character wherein is provided an improved packing expansible under the automatic action of the fluid pressure, and arranged with its base in communication with the atmosphere to prevent the accumulation of pressure there-beneath, so as to render the packing ineffective.

A further object of the present invention resides in providing an improved pipe coupling wherein the parts will be few and simple and arranged for ready assembly to permit of quick repairs, as it is essential to avoid delaying trains that the repairs may be made with all possible despatch.

With these and other objects in view the invention consists in the novel details of construction and combinations of parts more fully hereinafter disclosed and particularly pointed out in the claims.

In the accompanying drawings forming a part of this application, and in which similar reference symbols indicate corresponding parts in the several views: Figure 1 is a side elevational view, partly in section, of an improved pipe coupling constructed in accordance with the present invention. Fig. 2 is an end elevation of the same. Fig. 3 is a bottom perspective view of the washer employed under packing 10. Fig. 4 is a perspective view of a plug used in connection with the invention.

Referring more particularly to the drawings, 1 designates an elbow constructed at either end with an external shoulder 2, and threaded to receive coupling nuts 3. Following the usual manner, the coupling nuts 3 are provided with inturned flanges 4, coöperating with complemental flanges 5 for connecting swivel sections 6, the same being enlarged and internally threaded to receive the train pipe, as will be understood. Interposed between the flanges 4 and 5 are rings 7 of Babbitt metal or other material suitable for furnishing bearings upon which the flanges 5 of the swivel section 6 may freely revolve, and also furnishing secondary packings to prevent the escape of fluid should the primary gaskets become disrupted, as hereinafter described.

The inner ends of the swivel sections 6, above the flanges 5, are reduced, as advantageously shown in Fig. 1, and are received, at their inner ends in recesses formed in abutments 8 cast or otherwise produced in the elbow 1. In the annular chambers 9, formed between the reduced inner portions of the swivel sections 6 and the outer walls of the elbow 1, are fitted expansible gaskets 10 of any suitable construction, preferably of the type set forth more specifically in my co-pending application Serial No. 870,650, filed November 6, 1914, and entitled "Improvements in washing apparatus". As advantageously disclosed in Fig. 1 such gasket 10 is constructed of suitable expansible material and formed with a V-shaped groove 11, providing concentric divided walls 12 and 13 arranged to receive and be expanded by the internal pressure of the conduits.

The annular chamber 9 is placed in communication with the interior of the elbow 1 and conduits through series of perforations 14 and 15, provided respectively in the abutments 8 and reduced inner portions of the swivel member 6. Such perforations 14 and 15 afford free admittance of the fluid pressure into the chambers 9, wherein is located the expansible gaskets 10; and the pressure is received into the V-shaped grooves 11 thereof and operates to expand the concentric divided walls 12 and 13 to provide a tight joint between the swivel sections and elbow walls, as will be apparent. Said perforations also form drains to prevent water from freezing in said chamber.

Beneath the expansible gaskets 10, in the annular chambers 9, are placed washers 16 supported on the flanges 5 of the swivel members 6, and illustrated more particularly in Fig. 3 to be provided with beveled inner and outer lower edges 17 and 18, and traversed by radial channels 19 shown to be arranged in diametrically opposed pairs, although the same may be produced in any other desired manner. The radial channels 19 in the washer 16 are fitted opposite grooves 20 formed in the outer ends of the elbow 1; the same being connected by an annular channel, preferably constituted by the screw threads 21, which, as shown in Fig. 1, are extended beneath the flanges 5 in the swivel member 6. The coupling nuts 3 are provided with openings 22 for placing the annular channel 21 in direct communication with the atmosphere, and the openings may be threaded, as indicated, for receiving plugs 23, as shown in Fig. 4, when the gasket 10 has been disrupted, as hereinafter described.

It will be understood that the arrangement of radial channels 19 in the washer 16, grooves 20, and screw threads 21 place the base of the gasket 10 in direct communication with the atmosphere through the openings 22 in the coupling nuts 3, and relieve all leakage of pressure about said gaskets and prevent the accumulation of pressure beneath the same, so as to render the gaskets ineffective. It will thus be appreciated that the full effect of the pressure in the train pipe will be utilized to expand the walls 12 and 13 of the gasket 10, and provide a tight joint between the members of the coupling.

Provided the gaskets 10 give way, or become disrupted, during operation, so as to place the interior of the conduit in direct communication with the atmosphere, the plugs 23 may be inserted in the threaded openings 22 and prevent the escape of the fluid until such time as repairs may be made.

It is to be understood that the gasket 10 is normally effective to provide a tight joint and the secondary packing 7 is inoperative. In case of emergency, when the gasket 10 is disrupted or springs a leak, the plug 23, or other suitable device, will be arranged to close the communication with the atmosphere, and the secondary packing will thereupon become effective and prevent leakage.

It is obvious that those skilled in the art may vary the details of construction and arrangements of parts without departing from the spirit of my invention, and therefore I do not wish to be limited to such features except as may be required by the claims.

I claim:

1. In a pipe coupling, the combination of a pair of pipe sections provided one with a plurality of transverse grooves therein, a coupling nut provided with an annular passage connecting said grooves and an opening placing said passage in communication with the atmosphere, an expansible gasket located in said coupling and arranged with its base in communication with said grooves, and a plug for insertion in the opening in said coupling collar to close communication with the atmosphere, substantially as described.

2. In a pipe coupling, the combination of pipe sections providing a chamber adapted to be arranged in communication with the atmosphere, a gasket located in said chamber, and a washer arranged beneath said gasket and provided with transverse channels for conducting away leakage about said gasket to the atmosphere, substantially as described.

3. In a pipe coupling, the combination of pipe sections providing a chamber adapted to be arranged in communication with the atmosphere, a gasket mounted in said chamber, and a washer located beneath said gasket and provided with beveled under edges and a plurality of transverse channels for conducting away leakage, substantially as described.

4. In a pipe coupling, the combination of pipe sections providing a chamber therebetween, means for coupling said sections together and provided with a passage placing said chamber in communication with the atmosphere, a gasket mounted in said chamber, a washer located beneath said gasket and provided with a plurality of transverse openings leading to said passage for conveying away leakage, and means for closing atmospheric communication, substantially as described.

5. In a pipe coupling, the combination of a pair of pipe sections formed one with transverse grooves therein, means for connecting said sections together and provided with a passage connecting said grooves and an opening for placing said passage in communication with the atmosphere, a plug for closing said opening, a gasket mounted between said pipe sections, and a washer located beneath said gasket and provided with a plurality of transverse channels registering with the grooves in said pipe section for conveying away leakage, substantially as described.

6. In a pipe coupling, the combination of a pair of pipe sections providing a chamber therebetween in communication with the interior thereof and formed one with a plurality of transverse grooves in communication with said chamber, an expansible gasket mounted in said chamber, a washer located beneath said gasket and provided with a plurality of transverse channels registering with the grooves in said pipe section, a coupling nut provided with a passage connecting said grooves and an opening placing said passage in communication with the atmosphere, and a removable plug adapted to be inserted in the opening in said coupling nut for closing atmospheric communication, substantially as described.

7. In a pipe coupling, the combination of an elbow provided with transversely grooved ends, a perforated and shouldered abutment in said elbow, a swivel pipe section received into said elbow and fitted against the shoulder provided by said abutment, a flange on said swivel section for engaging the grooved end of said elbow, an expansible gasket arranged between said elbow and swivel section with its base in communication with said grooves, a coupling nut provided with a passage connecting said grooves and an opening placing said passage in communication with the atmosphere, a flange on said coupling nut, a secondary packing mounted between said flanges, and means for closing the opening in said coupling nut when said gasket is disrupted to prevent leakage and bring said secondary packing into action, substantially as described.

8. In a pipe coupling, the combination of an elbow provided with transversely grooved ends, perforated and shouldered abutments in said elbow, swivel pipe sections provided with reduced and perforated inner portions fitted to revolve against the shoulders of said abutments and providing with the ends of said elbow annular chambers in communication with the fluid through said perforations, flanges formed on said swivel sections engaging the grooved ends of said elbow and providing bases for said chambers, expansible gaskets mounted in said chambers, annular washers mounted to rest on said flanges and supporting said expansible gaskets, said washers being provided with transverse under-channels registering with the grooves in said elbow ends, coupling nuts for connecting said elbow and swivel sections and provided with annular passages connecting the said grooves and openings in communication with the atmosphere, flanges on said coupling nuts, secondary packings located between said flanges, and plugs for closing the openings in said coupling nuts, substantially as described.

9. In a pipe coupling, the combination of adjacent pipe sections providing therebetween a chamber in communication with the atmosphere, an expansible gasket located in said chamber, a coupling collar, a secondary packing mounted between said coupling collar and one of said pipe sections, and means for closing communication from said chamber to the atmosphere when the gasket becomes disrupted to prevent leakage and bring said secondary packing into play, substantially as described.

In testimony whereof, I affix my signature, in presence of two witnesses.

WILLIAM S. PIERCE.

Witnesses:
 JOHN L. NESBIT,
 MARGARET MARTIN.